United States Patent Office 3,317,441
Patented May 2, 1967

3,317,441
METHOD FOR TEMPORARILY PROTECTING SENSITIVE SURFACES BY DIRECT-CONTACT FILM-FORMING COATINGS
Jacques Martial Baudin, 51 Ave. de Suffren, Paris, France
No Drawing. Filed Apr. 23, 1962, Ser. No. 189,323
Claims priority, application France, Apr. 29, 1961, 860,373
2 Claims. (Cl. 260—5)

The present invention relates to an improved method for temporarily protecting sensitive body surfaces by applying thereon film-forming coating substances.

In present practice, two methods are generally resorted to for the temporary protection of such surfaces:

(a) The method of applying the protective products in direct contact with the surfaces to be protected;

(b) The wrapping-up method by means of preassembled material, should the nature of the articles or parts to be protected not comply with the method mentioned under (a).

Certain types of bodies, articles, material, equipment cannot, in effect, be treated by directly applying the protective coating, such bodies being either of intricate shape, which may result in difficulties in removing the protective coating, or bodies whose structure in contact with the protective substance might experience a chemical, physical or mechanical attack or damage, either during the application, or during the removal of the protective coating, or else, undergo a transformation during the period of protection.

It is however essential that a protection system of this kind should not cause any chemical, physical or mechanical change in the protected element during the period of protection. Two factors are to be considered in connection therewith:

(1) The resistance, during a predetermined period of time, of the protection means to one or a plurality of degrading agents, i.e. the maintenance of the protected element in its initial state.

The main degrading agents are:

The sun and the ultra-violet rays,

The atmosphere, oxygen, ozone, other contaminants (such as additional atmospheric components, $CO_2$, $SO_3$, $SH_2$), humidity, Chemical agents (natural and artificial: acid and alkaline compounds and ionozable salts), Temperature, Abrasion and erosion, such as: locomotive cinders or dust particles, Various soiled fragments, sand, soot, gravel, etc., Other elements, natural (rain, wind, hail, snow, storm . . . ), mechanical (scratches, abrasion . . . ), Biological effects, Effects due to the substratum.

(2) The resistance of the protected base to the action of the protective substances, i.e. a total chemical, physical or mechanical inertness between the coating compound and the base thereof, during any stage of operation: application, utilization and removal or elimination.

Thus, the following sensitive elements, listed by way of example only, of leather, fabric, wood, rubber, plastic, painted, enamelled, polished(, lacquered, tiles, marble, glass, crystal, porcelain, ceramic, fruit and vegetables etc., cannot be effectively protected by a conventional, direct-contact coating application, since the composition of the coating product may cause direct or indirect modifications in the structure of the elements.

The main types of produces used for direct-contact, temporary protection of bodies are:

(a) Oily substances, petrolatum, fats, lanoline and other derivatives of similar type applied either in the cold or in the hot state, or in solution in toxic or inflammable solvents.

Such products cannot be applied on sensitive surfaces, for instance (and by way of a non-limitative example) painted surfaces, since solvents must be used either for application purposes, or for removing the product during unstoring. Painted surfaces are essentially responsive to solvents, and thus risk to be chemically or physically attacked thereby.

(b) The plastic coatings adapted to be removed by means of solvents or to be applied in a solvent medium, and therefore not to be used as in the previously mentioned case, and plastic coatings adapted to be removed by a film-peeling operation.

In the range of the protection systems wherein the protective coatings is adapted to be removed by the process of film peeling, four different basic methods have been industrially developed:

(1) Plastics used or dipped in the molten state, and which are generally alkylated derivatives of cellulose (ethyl cellulose, acetobutyrate cellulose), and a mixture of plasticizers.

The application of these products is effected at very high temperatures (about 170° C.), thus limiting the utilization possibilities to articles the structures of which are not responsive to such high temperatures. On the other hand, with such material it is impossible to treat in baths assemblies exceeding a given volume.

(2) Plastics or synthetic resins in solvent solution (such as, mainly, resins of the polyvinyl type). The application of these substances cannot be effected on surfaces which are sensitive to solvents (parts or articles of plastic, rubber, painted surfaces . . .).

On the other hand, the mechanical resistance of the resulting film is comparatively low.

(3) Plastics or synthetic resins in an aqueous solution (derivatives of cellulose, polyvinyl alcohol, etc.).

The mechanical resistance of such films is substantially low and the resistance to humidity substantially nil, on account of the use of soluble and reversible resins.

(4) Plastics or synthetic resins in emulsion (resins of the polyvinyl and acrylic type etc.). These substances present however a low mechanical resistance and too high an adherence coefficient.

The present invention has for its main object to provide a novel and improved method for temporarily protecting sensitive surfaces by means of a film-forming coating, adapted to be applied both during storage and transportation, and during handling and various machining stages, onto all kinds of surfaces and more particularly onto sensitive and delicate surfaces, without causing any physical, chemical or mechanical damage or degradation thereon, at any stage of the operation.

According to another feature of the invention, these coating substances consist of elastomers in an aqueous emulsion, thus enabling to provide films of high resistance to chemical, physical and mechanical action, on account of their intrinsic elasticity.

According to another feature of the invention, the basic elastomers utilized are taken separately or in combination with other polymers: elastomers or plastomers. The plasticizing is obtained by the selection of the polymers developed, under elimination of any organic and migrating plasticizer.

According to still another feature of the invention, these mixtures of high polymers in an aqueous phase, are prepolymerized in such a manner that the simple evaporation of the vehicle ensures the formation of a continuous, homogeneous and irreversible film. These mixtures do not comprise any free catalyser agent.

Finally, according to still another feature of the invention, the elimination or removal of the resulting coatings is readily and economically effected, without resorting to the use of solvents or abrasives which may cause the carrier base to be damaged. Thus, and according to the formula developed, the elimination or removal of the film may take place either by wiping after soaking, or by means of a jet of water under high pressure, or simply by film peeling.

The application of the various formulae derived from this method takes place in the cold state, by any of the conventional known means (dipping, spraying, brushing, casting . . .).

By simple evaporation of the vehicle, at the ambient temperature, there is formed on the object it is desired to protect a homogeneous and irreversible film.

The drying time of the film may be reduced by artificially raising the temperature.

As a non-limitative example of the method according to the invention, and assuming it is desired to protect a motor vehicle leaving a production line, either during a storage period in a parking station, or during sea or railway shipping, it will be necessary to apply a system of protection, satisfying to the following conditions:

(1) The protecting means must be inert relative to the various kinds of the surfaces to be protected: painted car body, pieces of plastic, rubber, polished aluminium, chrome plated parts, fabrics, glass etc., i.e. the coating product must not only leave unaffected the various types of surfaces to be protected, but the method applied should not involve a treatment or products (by abrasion or solvents) which might, during the coating or the removal of the film, cause any damage to such surfaces.

(2) The protection means must resist to the atmospheric and/or other contamination agents, as previously stated.

(3) The application, utilization and removal must be readily and economically carried out.

The main element of the composition is provided by one or a plurality of elastomers to which one or several plastomers, such as polyvinyl acetate, is or are added as intensifiers. The elastomers and/or plastomers and their relative proportions are selected depending on the specific applications corresponding to the composition. The other elements of the composition are selected and determined as a function of the elastomer(s).

The invention contemplates adding to said main element a filler in a proportion sufficient for the film to acquire the desired resistance for the application considered, so as to enable it to resist, for instance, to the effects of the most violent storms to which the piece or assembly protected by said coating may be subjected. In this connexion, and according to the invention, the filler must be present in a proportion exceeding 25% of the polymer(s) (i.e. the combination elastomer-plastomer) and, preferably, 50%, although it may rise up to 1,000%.

According to an essential feature of the invention, the protective composition, besides said filling agent contained therein in a comparatively high or very high proportion, also contains one or a plurality of surface active products, selected for their particular wetting, emulsifying and dispersive power.

The presence of one or several surface active products facilitates the removal of the coating film owing to the combined effect of the water and of a mechanical action. The film may then be removed by any convenient means used in the industry, and, for instance, a jet of water under a pressure of 16 to 18 kg. per square centimeter. The proportion of the surface active product varies as a function of the application considered. The higher the contents of the filler in the composition, the higher the proportion of the wetting product.

The proportion of the wetting agent should not however be too great, in view of the bad weather conditions to which the coated piece or assembly may be subjected.

Under normal conditions, the proportion of the surface active product ranges from 0 to 10% of the protective component.

The composition may also include zinc oxide which acts as a chemical stabilizer when the plastomers have an acid function, as for instance in the case of the polychloroprene where the zinc oxide blocks the chlorine ions.

The following is a composition, in aqueous emulsion, given by way of a non-limitative example; the numerical values mentioned should advantageously be adhered to with an accuracy of the order of 5%, the parts being by weight:

| | |
|---|---|
| Polychloroprene (such as neoprene latex 750, in a 50% aqueous emulsion) | 200 |
| Polyisobutylene of high molecular weight, in a 50% aqueous emulsion | 14 |
| Natural rubber (latex), in a 50% aqueous emulsion | 6 |
| Chemical stabilizer, such as a condensate of ethylene oxide and of a non-ionogenic surface active agent | 2 |
| Mechanical stabilizer, such as oleyl-p-anisidine, sodium sulfonate | 3 |
| Anti-oxidant, such as polymerized alkyl-phenol | 4 |
| Bactericidal agent, such as sodium orthophenylphenate | 1 |
| Surface active wetting agent, such as the butylester of the sulfonated ricinoleic acid | 4.5 |
| Emulsifier surface active agent, such as the oleic alcohol sulfonate | 2.5 |
| Ammonium polyacrylate | 10 |
| Zinc oxide | 6 |
| Water | 38 |
| Mineral filling load, such as silica, kaolin | 709 |

It is obvious that the various components listed should show compatibility during the mixture thereof, this requirement calling for a similarity of their ionic load and their pH-value, so that no coagulation or precipitation may occur.

A formula of this kind results in a coating which resists to rain and bad weather conditions and which, owing to the surface active agents included therein, may be readily removed or eliminated either by a water jet under high pressure, or after soaking through a reduced mechanical action such as by simple wiping.

By modifying the ratio polymers/fillers in the above formula, film-forming coatings may be obtained having the same protection characteristics on all kinds of support bases, even the most sensitive, and adapted to be eliminated by simple film peeling.

The above mentioned examples are obviously not limitative.

The direct-contact, temporary protection method described may thus be applied not only on surfaces, objects, pieces, material, equipment of the so-called sensitive type, but also on any type of surfaces, whatever. It is thus possible to apply this method for temporarily protecting metal surfaces. In this case, it is essential to incorporate into the mixtures specific corrosion inhibitors. Such inhibitors may also be systematically incorporated to any formulae according to the invention, so as to be able to utilize readily corrodable metallic vessels for aqueous solutions, either in the manufacturing stage, or at the delivery and packing stage.

Similar protection compositions, based on the same principle of utilizing elastomers, may be realized, the aqueous emulsion vehicle of which may be substituted by the solvents of the polymers employed. The application of these compositions in a solution of solvents is obviously limited to carrier supports insensible to such solvents. The characteristics of the coatings thus obtained remain identical, as well as the elimination methods.

It is to be understood that the invention is not limited to the embodiments described and illustrated, given by way of examples only, other embodiments being within the reach of the skilled man, without departing from the spirit and scope of the invention.

It is thus possible to obtain, on the same principle but by modifying the proportions of the constituents, more or less adherent coatings, such coatings being applicable, according to the desired features, on any supports, without any limitation.

What I claim is:

1. A composition adapted to be applied on a mechanical piece in order to form a removable protective coating on said piece, said composition being an aqueous emulsion comprising (A) an elastomeric component comprising polychloroprene, polyisobutylene, and natural rubber in the approximate weight ratio of 200:14:6; (B) butyl ester of sulfonated ricinoleic acid and oleic alcohol sulfonate, these ingredients being present in the emulsion in an amount not exceeding 10% by weight based on the elastomeric component; and (C) a mineral filler in an amount exceeding 25% based on the weight of the elastomeric component.

2. A composition adapted to be applied on a mechanical piece in order to form a removable protective coating on said piece, said composition being an aqueous emulsion comprising the following ingredients in approximately the following proportions:

| | Parts by wt. |
|---|---|
| Polychloroprene | 200 |
| Polyisobutylene | 14 |
| Natural rubber | 6 |
| A condensate of ethylene oxide and a non-ionic surface active agent | 2 |
| Oleyl-p-anisidine, sodium sulfonate | 3 |
| Polymerized alkyl-phenol as an anti-oxidant | 4 |
| Sodium orthophenyl-phenate | 1 |
| Butyl ester of sulfonated ricinoleic acid | 4.5 |
| Oleic alcohol sulfonate | 2.5 |
| Ammonium polyacrylate | 10 |
| Zinc oxide | 6 |
| A mineral filler selected from the group consisting of silica and kaolin | 709 |

References Cited by the Examiner

UNITED STATES PATENTS

| 2,132,230 | 10/1938 | Copeman | 117—6 |
| 2,540,996 | 2/1951 | Ryden | 260—29.7 |
| 2,595,797 | 5/1952 | Leyonmark et al. | 260—29.7 |
| 2,913,429 | 3/1956 | Floria et al. | 117—6 |
| 2,971,863 | 2/1961 | Kindseth et al. | 260—5 |

OTHER REFERENCES

Sisley, J. P., Encyclopedia of Surface-Active Agents, N.Y., Chemical Publishing Co., 1952, pp. 203, 209 TP–990 S5iE.

MURRAY TILLMAN, *Primary Examiner.*

GEORGE F. LESMES, WILLIAM H. SHORT, M. J. TULLY, J. W. SANNER, *Assistant Examiners.*